(12) United States Patent
Passarotto

(10) Patent No.: US 6,382,734 B1
(45) Date of Patent: May 7, 2002

(54) BICYCLE WHEEL

(75) Inventor: Maurizio Passarotto, Rovigo (IT)

(73) Assignee: Compagnolo Srl, Venice (IT)

( * ) Notice: Subject to any disclaimer, the term of this patent is extended or adjusted under 35 U.S.C. 154(b) by 0 days.

(21) Appl. No.: 09/779,651

(22) Filed: Feb. 9, 2001

(30) Foreign Application Priority Data

Nov. 14, 2000 (IT) ........................................ TO00A1064

(51) Int. Cl.⁷ .............................................. B60B 27/00
(52) U.S. Cl. ........................ 301/55; 301/59; 301/110.5
(58) Field of Search .............................. 305/55, 56, 58, 305/59, 95.101, 95.104, 95.106, 104, 110.5, 73, 74

(56) References Cited

U.S. PATENT DOCUMENTS 1,179,646 A * 4/1916 Moyer
1,313,976 A * 8/1919 Ash
1,836,818 A * 12/1931 Suazedde
5,938,293 A * 8/1999 Dietrich

* cited by examiner

Primary Examiner—Russell D. Stormer
(74) Attorney, Agent, or Firm—Sughrure Mion, PLLC

(57) ABSTRACT

A bicycle wheel (10) comprising a rim (12), a hub (14), and a plurality of spokes (20, 22) having their outer ends fixed to the rim (12) and their inner ends fixed to the hub (14), the hub (14) having a left-hand anchoring portion (16) and a right-hand anchoring portion (18) for anchorage, respectively, of a set of left-hand spokes (20) and a set of right-hand spokes (22). The aforementioned spokes (20, 22) are grouped together in an even number of sets of three (24a, 24b) set at equal distances apart and comprising, alternately, two right-hand spokes (22) and one left-hand spoke (20), and two left-hand spokes (20) and one right-hand spoke (22).

6 Claims, 2 Drawing Sheets

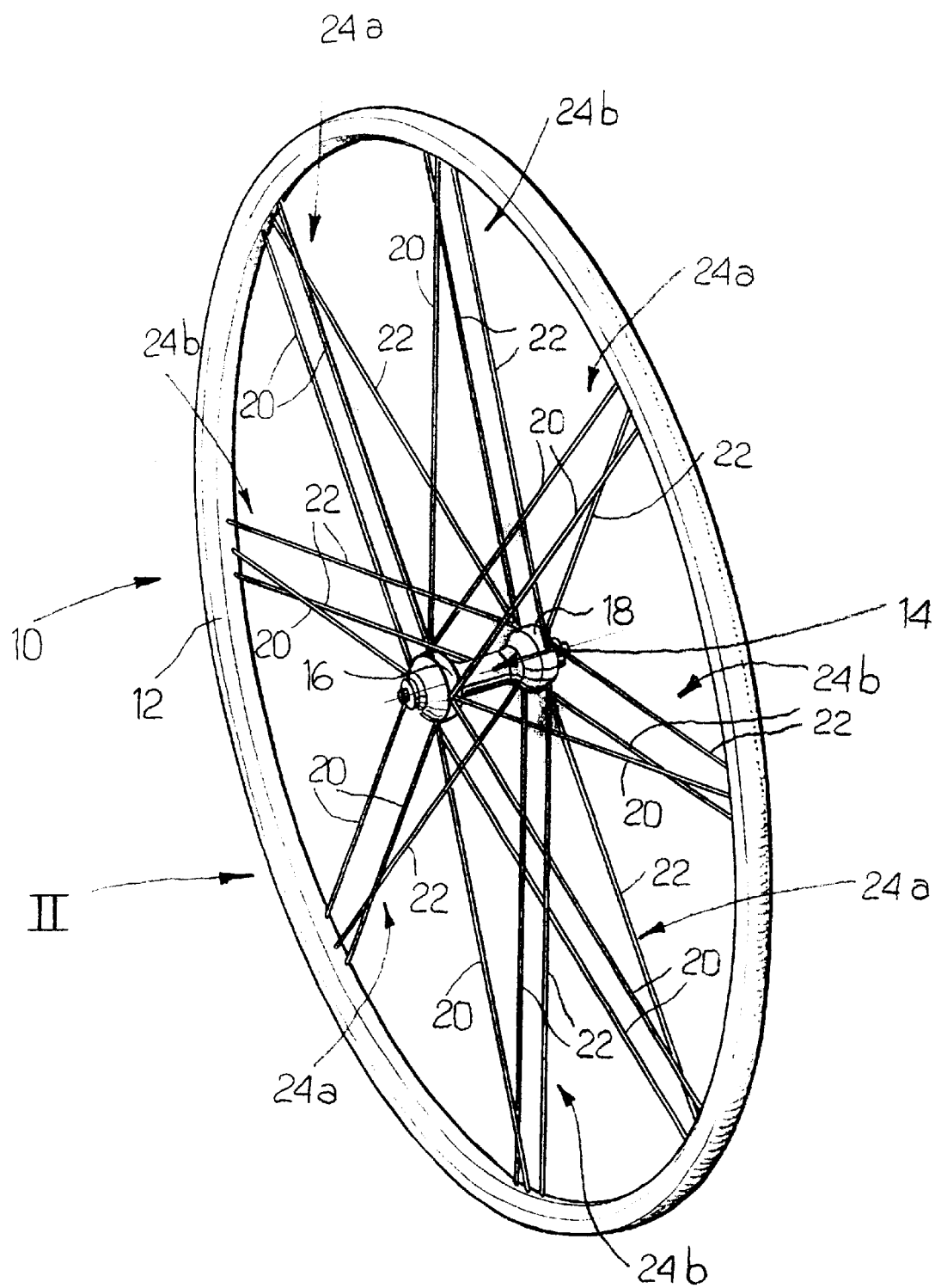
Fig_1

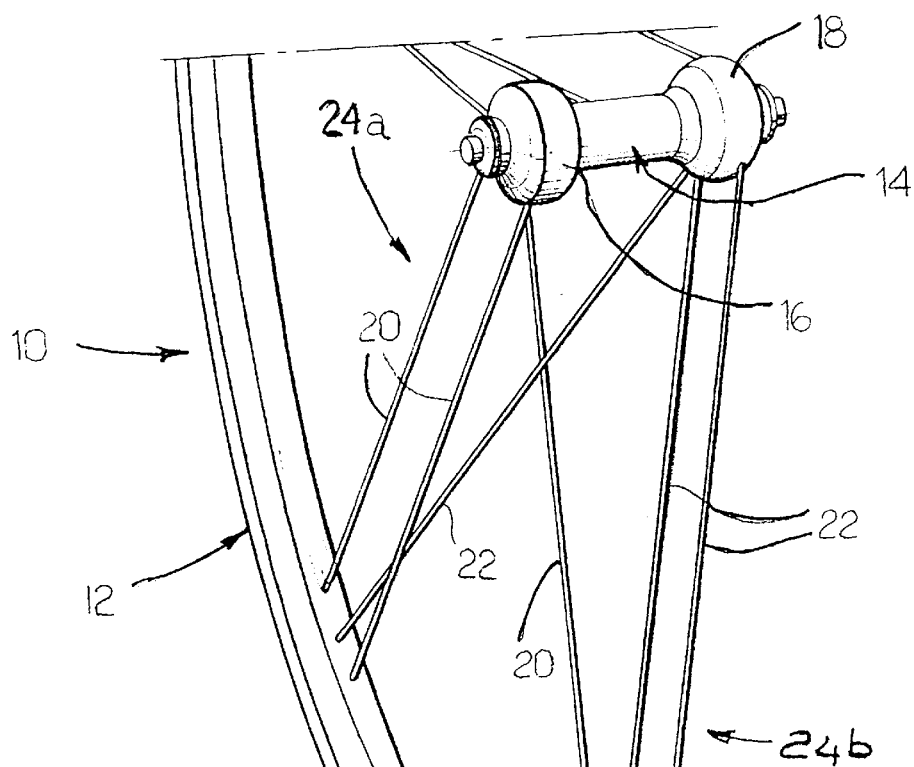
Fig_2
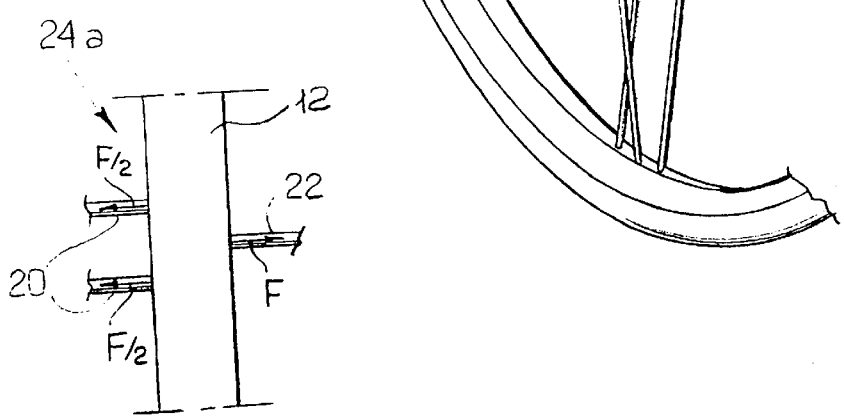
Fig_3

BICYCLE WHEEL

The present invention relates to a bicycle wheel, in particular a front wheel for a racing bicycle. More precisely, the invention relates to a wheel of the type comprising a rim, a hub, and a plurality of spokes having their outer ends fixed to the rim and their inner ends fixed to the hub. With reference to the position of assembly on a bike, the hub presents a right-hand anchoring portion and a left-hand anchoring portion for anchorage, respectively, of a set of right-hand spokes and a set of left-hand spokes.

The consolidated technique for mounting wheels envisages attachment of the spokes on the rim at equal distances apart in the circumferential direction. Alternately set along the circumference of the rim are the attachments for the left-hand spokes and the attachments for the right-hand spokes, i.e., with one left-hand spoke alternating with one right-hand spoke.

Albeit consolidated, this arrangement presents certain drawbacks. In particular, the rim undergoes an undulated deformation in the direction parallel to the axis of the hub because the axial component of the pull of the spokes tends to force the rim out of the optimal condition of planarity.

Usually, the stiffness of the rim is able to make up for this deformation, limiting the said deformation below a threshold where the cyclist is unable to perceive it. However, to limit the axial deformations of the rim it may be necessary to resort to an oversizing of the latter.

Other known solutions use an arrangement where the right-hand spokes and the left-hand spokes are set close to one another in twos, so as to make the points of anchorage on the rim of each right-hand spoke and of the corresponding left-hand spoke as close as possible to one another. The aim is to cause the axial component of the pull of the spokes to be offset locally, neutralizing the effect of destabilization of the rim. This known solution is, however, subject to limitations of a technological nature, such as the encumbrance of the means of attachment of the spokes (nipples or nuts), the need for space to insert the wrenches or other tools used for assembly, etc., and moreover entails limits of structural strength of the rim due to the vicinity of two holes on the wall that are subjected to the pull of the spokes. It follows that this known solution is again affected by problems of local flexure, which tend to bring the rim out of conditions of planarity.

The purpose of the present invention is to eliminate the problems regarding axial unbalancing of the forces acting on the rim which are due to the pull of the spokes.

According to the present invention, the above purpose is achieved by a wheel having the characteristics that form the subject of claim 1.

The solution according to the present invention groups the spokes together in an even number of sets of three spokes set at equal distances apart, which comprise, alternately, two right-hand spokes and one left-hand spoke, and two left-hand spokes and one right-hand spoke. In each set of three spokes, the spoke which is set singly on a given side of the wheel will be tensioned with a pull nominally twice the pull with which the two spokes of the same set acting on the opposite side of the wheel are tensioned.

Further characteristics and advantages of the wheel according to the present invention will emerge clearly from the ensuing detailed description, which is provided purely by way of non-limiting example, in which:

FIG. 1 is a perspective view of a wheel according to the present invention;

FIG. 2 is a perspective view illustrating, at a larger scale, the part indicated by the arrow II in FIG. 1; and FIG. 3 is a schematic view illustrating the forces applied to the rim by one of the sets of three spokes.

With reference to FIGS. 1 and 2, the number 10 designates a bicycle wheel, in particular a front wheel for a racing bicycle. The wheel 10 comprises a rim 12, a hub 14, and a plurality of spokes 20, 22 having their outer ends fixed to the rim 10 and their inner ends fixed to the hub 14. The rim, the spokes and the hub may be of any type and may be made of any material. In particular, the hub may have the shape illustrated, by way of example, in the figures, or else may be of the more common type with radial flanges.

In a conventional way, the hub 14 has a left-hand anchoring portion 16 and a right-hand anchoring portion 18. The terms "left-hand" and "right-hand" refer to the condition in which the wheel 10 is mounted on a bicycle (not illustrated).

The spokes that are fixed to the left-hand anchoring portion 16 are referred to as left-hand spokes and are designated by the reference number 20, whilst the spokes that are fixed to the right-hand anchoring portion 18 are referred to as right-hand spokes and are designated by the reference number 22. The present invention is not limited to any particular way of fixing the spokes 20, 22 to the rim and to the hub.

According to the present invention, the spokes 20, 22 are grouped in an even number of sets of three 24*a*, 24*b*, which are set at equal distances apart. The sets of three spokes 24*a* comprise two right-hand spokes and one left-hand spoke, whilst the sets of three spokes 24*b* comprise two left-hand spokes and one right-hand spoke. The sets of three spokes 24*a* and 24*b* are arranged alternately.

In the embodiment illustrated by way of example in FIG. 1, the wheel 10 comprises eight sets of three spokes in all. The number of sets of spokes may, for example, vary from four to twelve.

In each set of three spokes 24*a*, 24*b*, the single spoke is connected to the rim 12 in an intermediate point between the points of attachment of the pair of opposed spokes. In each set of three spokes 24*a*, 24*b*, the spokes set on the same side of the wheel may be parallel to one another, or converge in the direction going from the hub to the rim, or else diverge in the direction going from the hub to the rim.

With reference to FIG. 3, in each set of three spokes 24*a* or 24*b* the spoke that acts singly on the respective side of the wheel will be subjected to a load F with a pull nominally twice the pull F/2 at which the opposed spokes of the same set of three spokes are tensioned. In this way, the system of forces applied to the rim 12 is locally balanced for each set of three spokes 24*a* and 24*b*. The axial components of the forces of tensioning of the spokes do not induce deformations of the rim 12 in the direction parallel to the axis of rotation of the wheel. The distance between the points of attachment of the spokes to the rim 12 is not tied to any considerations of overall balance of the wheel. In this way, the rim 12 can be sized without taking into account the geometrically destabilizing effects in the axial direction that are due to tensioning of the spokes.

Of course, without prejudice to the principle of the invention, the details of construction and the embodiments may be varied widely with respect to what is described and illustrated herein purely by way of example, without thereby departing from the scope of the present invention as defined in the ensuing claims.

What is claimed is:

1. A bicycle wheel comprising a rim, a hub, and a plurality of spokes having their outer ends fixed to the rim and their inner ends fixed to the hub, the hub having a left-hand anchoring portion and a right-hand anchoring portion for anchorage, respectively, of a set of left-hand spokes and a set of right-hand spokes, said the aforementioned spokes being grouped together in an even number of sets of three set at equal distances apart and comprising, alternately, two right-hand spokes and one left-hand spoke, and two left-hand spokes and one right-hand spoke.

2. A wheel according to claim 1, wherein in each set of three spokes, the spoke that is set singly on the respective side of the wheel is fixed to the rim in an intermediate position between the points of anchorage of the pair of spokes of the same set of three spokes set on the opposite side of the wheel.

3. A wheel according to claim 2, wherein in each set of three spokes, the spoke that is set singly on the respective side of the wheel is subjected to a nominal tensioning force twice the nominal tensioning force of each of the remaining spokes of the same set of three spokes.

4. A wheel according to claim 1, wherein in each set of three spokes, the two spokes set on the same side of the wheel are parallel to one another.

5. A wheel according to claim 1, wherein in each set of three spokes, the two spokes set on the same side of the wheel converge in the direction going from the hub to the rim.

6. A wheel according to claim 1, wherein in each set of three spokes, the two spokes set on the same side of the wheel diverge in the direction going from the hub to the rim.

* * * * *

UNITED STATES PATENT AND TRADEMARK OFFICE
CERTIFICATE OF CORRECTION

PATENT NO.    : 6,382,734 B1
DATED         : May 7, 2002
INVENTOR(S)   : Maurizio Passarotto It is certified that error appears in the above-identified patent and that said Letters Patent is hereby corrected as shown below:

<u>Title page,</u>
Item [73], Assignee, reads "Compagnolo Srl, Venice (IT)" should read -- Campagnolo Srl, Vicenza (IT) --

Signed and Sealed this

Twenty-third Day of July, 2002

Attest:

Attesting Officer

JAMES E. ROGAN
*Director of the United States Patent and Trademark Office*